United States Patent [19]

Minderman et al.

[11] Patent Number: 4,936,869
[45] Date of Patent: Jun. 26, 1990

[54] LIQUID HYDROGEN POLYGENERATION SYSTEM AND PROCESS

[76] Inventors: Peter A. Minderman, 1681 Winchester Dr., Winter Park, Fla. 32789; Gary P. Gutkowski, 85 Kenneth Ct., Merritt Island, Fla. 32952; Lawrence Manfredi, 4309 Roanne Dr., Orlando, Fla. 32817; Julian V. King, 1125 Lane Ave., Titusville, Fla. 32780; Frank S. Howard, 946 Golden Beach Blvd., Indian Harbour Beach, Fla. 32937

[21] Appl. No.: 798,713

[22] Filed: Nov. 15, 1985

Related U.S. Application Data

[63] Continuation of Ser. No. 603,375, Apr. 24, 1984, abandoned.

[51] Int. Cl.$^5$ .......................... C10J 3/00; C10K 3/00; C01B 3/02
[52] U.S. Cl. ...................................... 48/77; 48/197 R; 48/203; 60/39.02; 60/39.12; 60/39.182; 423/655
[58] Field of Search ..................... 48/190, 197 R, 203, 48/210, 77, 63, 73, 61; 252/373; 60/39.02, 39.12, 39.182; 423/648 R, 655, 656

[56] References Cited

U.S. PATENT DOCUMENTS

| | | | |
|---|---|---|---|
| 2,660,521 | 11/1953 | Teichmann | 48/215 |
| 3,430,418 | 3/1969 | Wagner | 55/25 |
| 3,692,506 | 9/1972 | Johnson | 48/210 |
| 3,720,625 | 3/1973 | Kapp et al. | 423/359 |
| 3,728,093 | 4/1973 | Cofield | 48/190 |
| 4,132,065 | 1/1979 | McGann | 60/39.02 |
| 4,193,259 | 3/1980 | Muenger et al. | 60/39.12 |
| 4,212,160 | 7/1980 | Blaskowski | 60/39.12 |
| 4,233,180 | 11/1980 | Hausberger et al. | 252/373 |
| 4,354,347 | 10/1982 | Tomlinson et al. | 60/39.182 |

OTHER PUBLICATIONS

"Cool Water Cool Gasification Program–Second Annual Progress Report", Interim Report, EPRI AP-2487, Project 1459, Jul. 1982.

"New England Energy Park Feasibility Study for Alternative Fuels Production", Dept. of Energy, Contract No. DE-FG01-80RA 50343, Jun. 23, 1982.

Primary Examiner—Joye L. Woodard
Attorney, Agent, or Firm—John R. Manning; Charles E. B. Glenn; James O. Harrell

[57] ABSTRACT

An integrated polygeneration system and process is disclosed for generating liquid hydrogen as a main energy product for use as a propellant for space vehicles. Secondary energy products and commodities for supporting a space center complex and launching of the space vehicle includes the production of electrical and thermal energy and gaseous nitrogen. The integrated process includes a coal gasification and gas cleanup system (12), a combined cycle power generation system (18), a hydrogen production and liquefaction system (22) and a air separation system (32). A medium BTU gas (16) is produced by the coal gasification system and is delivered at (16a) to the power generation system and (16b) the hydrogen production and liquefaction system. Steam (14) also produced in the coal gasification process is delivered to a steam turbine in the combined cycle power generation system which is combined with a gas turbine to which the medium BTU gas is delivered to generate electrical and thermal power in a combined cycle power generation process. Steam from the coal gasification process is also delivered to a shift conversion unit in the hydrogen production system to increase the hydrogen content of the medium BTU gas prior to liquification. Air separation system (32) produces oxygen and gaseous nitrogen. The oxygen is utilized in the coal gasification process and the gaseous nitrogen is delivered for storage to a launch complex site where it is used as an inert gas to purge critical environments. The gaseous nitrogen is also utilized in the hydrogen production system where the nitrogen is liquified and used to refrigerate the hydrogen.

5 Claims, 2 Drawing Sheets

LIQUID HYDROGEN POLYGENERATION SYSTEM AND PROCESS

This is a continuation, division, of application Ser. No. 06/603,373, filed Apr. 24, 1984, which as abandoned upon the filing hereof.

BACKGROUND OF THE INVENTION

The invention relates to the production of liquid hydrogen in a polygeneration system and integrated process wherein coal, oxygen, and water are input into the system and liquid hydrogen is produced as the main energy product for use as a propellant in space vehicles. As secondary products, gaseous nitrogen, electrical energy, and thermal energy are produced in the integrated process. The gaseous nitrogen is used at the launch complex site as an inert gas for purging critical environments. The electrical and thermal energy are utilized at the space center facilities for power and space heating and air conditioning requirements.

The United States space shuttle program has been successful over the years and is to further develop into a space transportation system. As the space shuttle program becomes an operational space transportation system, the cost of operations, and more specifically, cost per flight, begin to take on added significance. Although in terms of capability, the space shuttle has no peers, competition is already on the horizon in the area of commercial launch services. While the space shuttle vehicle has been an outstanding success, the task of turning the space shuttle into an efficient and cost effective operation for carrying payloads and passengers into and out of space, is a problem to which considerable attention need be given.

The space shuttle program costs involve several areas. One area of concern is propellants, especially liquid hydrogen for the space shuttle's main engines. Liquid hydrogen is currently produced in a natural gas steam reforming plant in New Orleans, La. and transported to Kennedy Space Center by vacuum insulated tanker trucks. Natural gas prices have been increasing steadily even in the face of stabilizing oil prices. The rising costs are a result of decontrolling of the natural gas prices. The result has been spiraling costs for natural gas in some areas as the cost of gas reaches market clearing prices. The net effect of this is a very confusing short-term picture for natural gas prices. The rising and unstable prices of natural gas have an adverse affect on the cost for the space shuttle operations. Every launch of the space shuttle requires four hundred eighty-five thousand (485,000) gallons of liquid hydrogen after accounting for boil-off, transfer, and loading losses. The cost of this hydrogen is directly affected by the cost increases in natural gas.

Other important considerations in the cost of liquid hydrogen are electricity and transportation costs. Electricity is an important factor in the cost to liquify the hydrogen and represents almost twenty-five percent of the delivered price of the liquid hydrogen. Transportation is equally important in the cost of liquid hydrogen to Kennedy Space Center. The cost of transporting liquid hydrogen in tanker trucks from the southeastern part of the United States to Kennedy Space Center accounts for approximately twenty-five percent of its delivered costs.

Gaseous nitrogen is a commodity needed in the launching of space shuttle vehicles. Gaseous nitrogen is supplied from an alternate source by pipeline to the Kennedy Space Center. Electricity is supplied by a local utility in the state of Florida. The thermal energy is presently supplied by utilizing a boiler plant utilizing no. 6 fuel oil.

In accordance with the present invention, an integrated system and process is proposed for reducing the cost of liquid hydrogen and other commodities utilized in the space shuttle program by utilizing coal as a feed stock in an integrated process in which liquid hydrogen, gaseous nitrogen, electrical energy, and thermal energy are produced on-site at the space center.

In the early '70's, numerous co-generation processes were proposed for the combined generation of electrical and thermal energy to achieve overall higher process efficiencies. Recently, a proposal for gasifying coal to produce electrical and thermal energy has been proposed by the Electric Power Research Institute. This system is described in a report entitled "Cool Water Coal Gasification Program First—Annual Progress Report, Interim Report, No. EPRI AP-2487, Project 1459, July, 1982."

A system has also been proposed entitled the New England Energy Park which is described in a final report entitled "New England Energy Park Feasibility Study for Alternative Fuels Production", June 23, 1982 Department of Energy Contract No. DE-FGOl-80RA50343. This process proposes the use of coal as a feed stock which is gasified to produce electrical power and methanol as a byproduct. The New England Energy Park process utilizes conventional gasification of coal with heat recovery followed by separation of acid gases. The final gas stream is split and one gas stream is delivered to a steam turbine for the generation of electrical power. The other gas stream is delivered to a shift conversion process where the amount of hydrogen gas is increased for the production of methanol and synthetic natural gas.

While the above described projects and systems are satisfactory for their intended applications, they do not provide the totality of integrated processes required for the supply of multiple energy products and commodities necessary for the launch of a space vehicle and for supporting the launch.

Accordingly, an important object of the present invention is to provide an integrated system and process for generating energy products and commodities to reduce the operational costs per flight of an ongoing space shuttle transportation program.

Another important object of the present invention is to provide an integrated polygeneration system and process for earth-based space center operations which produces liquid hydrogen as a main product for use as a propellant for the shuttle vehicle and secondary energy products and commodities which support shuttle operations.

Yet another important object of the present invention is to reduce the cost of launching space vehicles by integrating the processes on-site required for making the energy products and other commodities required for the launch.

Still another important object of the present invention is to reduce the cost of launching space vehicles by utilizing an inexpensive single source of feedstock and integrating the processes for making the energy products and other commodities required for launch from the feedstock at a single geographical location.

Still another important object of the present invention is to provide a system and process for producing multiple energy products and by-products in which the various processes are integrated and wherein the system can be switched from the production of one energy product to another so that the system is always fully utilized and relatively insensitive to program variations.

SUMMARY OF THE INVENTION

The above objectives are accomplished according to the present invention by utilizing coal as an economic domestic feedstock. Gasification of the coal is carried out according to an integrated process. The integrated process includes four major systems and processes. The four major processes are (1) air separation (2) gasification and cleanup (3) combined cycle power generation and (4) hydrogen production and liquefaction.

The air separation system and process produces oxygen and gaseous nitrogen. The oxygen is supplied to the coal gasifier. The gaseous nitrogen is used as an inert gas to purge critical environments and is also used in the hydrogen liquefaction process. The nitrogen gas is liquified and used to refrigerate the hydrogen.

The gasification and gas cleanup system gasifies the input coal and cleans up the output gas to produce a clean medium BTU gas composed primarily of carbon monoxide and hydrogen. It has a BTU content of approximately 300 BTU's per cubic foot as compared to natural gas which has about 1000 BTU's per cubic foot. This medium BTU gas is used as a hydrocarbon feedstock for producing pure hydrogen and is combusted, similar to natural gas, in a combustion turbine for producing electrical power The gas stream exits the gasifier at a temperature of 2400 to 2700 degrees Fahrenheit. The thermal energy of the gas stream is recovered by means of a waste heat recovery system. The recovered thermal energy is used for space heating or cooling of the space center facilities or as steam delivered to a combined cycle power generation plant. Oxygen, supplied by the air separation process, is utilized in the gasification process to increase the BTU content of the output gas stream.

Since the nitrogen content of air is not present in the oxygen to dilute the output gas, the resultant gas stream from the gasifier is reduced downstream. This eliminates oversized downstream unit process which would be required to handle the larger gas stream if the nitrogen content was present in the air. Additional processes would also have to be added to remove the gaseous nitrogen downstream in order to produce the purity of the hydrogen required. While providing the above described advantages, the removed quantities of pure gaseous nitrogen are available as a byproduct from the air separation system and are used to meet requirements for nitrogen purge gas at the launch site facility.

The medium BTU gas coming from the coal gasifier is used both as a feedstock for making liquid hydrogen and as a gas turbine fuel. Since the carbon monoxide is created in the gasification process, the composition of the gas stream is an excellent feedstock for making hydrogen by utilizing a water shift reaction in which the carbon monoxide and water combine to produce additional hydrogen. By leaving carbon dioxide in the gas stream until the gas stream is split between the hydrogen production system and the power generation system, the carbon dioxide is highly pressurized and adds to the production of power in the turbine.

The hydrogen produced by the water shift reaction is purified by a commercial process which leaves a pure hydrogen stream which is fed to a hydrogen liquefaction plant. The liquified hydrogen is then piped to storage tanks for use as shuttle vehicle propellant.

The integrated requirements of coal gasification, liquid hydrogen production, gaseous nitrogen production, and electrical and thermal energy production lend themselves to an integrated polygeneration system and process as disclosed.

The on-location production of liquid hydrogen combined with electrical and thermal energy and gaseous nitrogen together with the cost of coal as a primary feedstock provide a synergistic approach to the problem of reducing the primary cost factors involved in the space shuttle program, particularly the cost factors of producing the liquid hydrogen.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
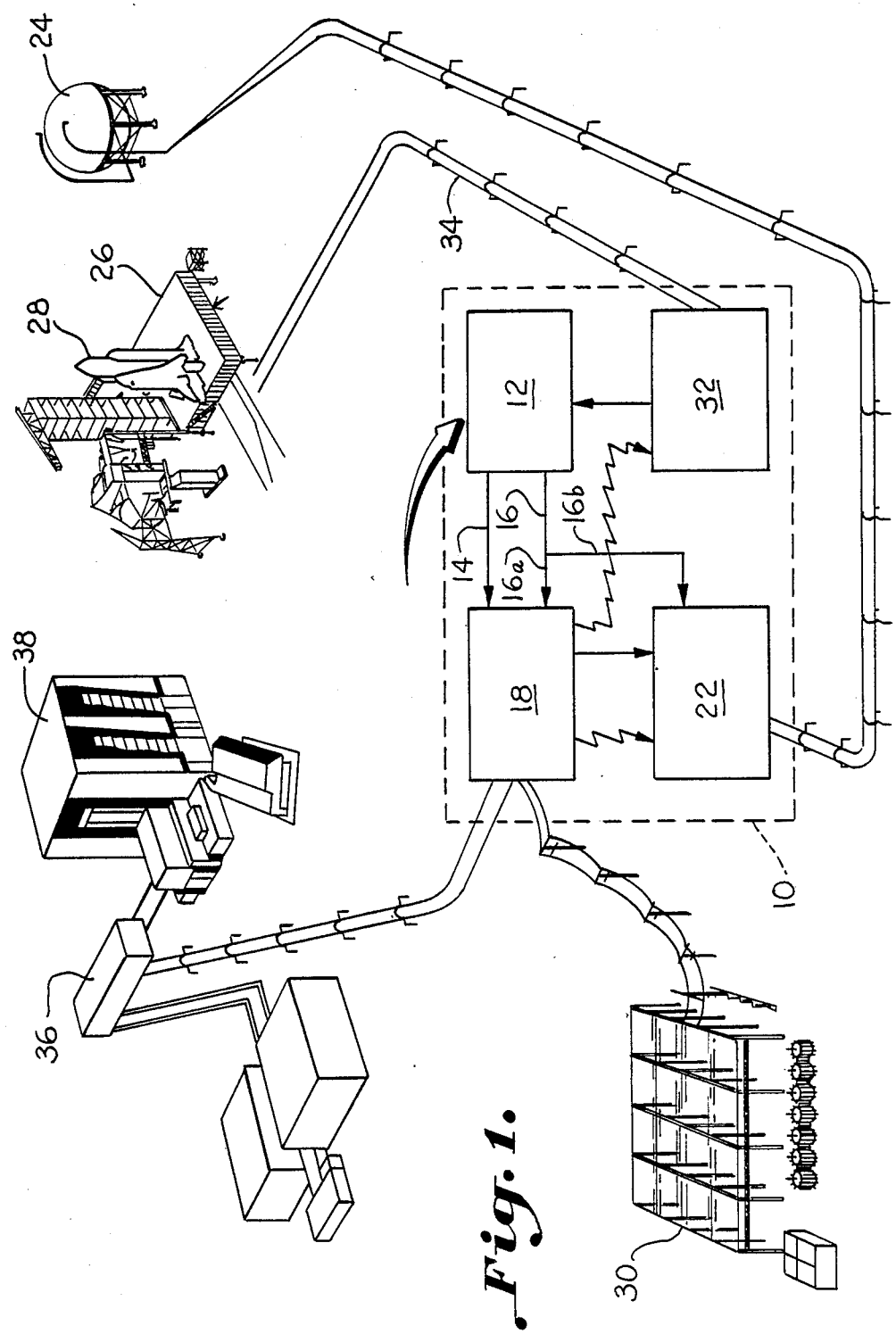
FIG. 1 is a schematic diagram of an integrated polygeneration system and process at a space center location illustrated according to the present invention for producing multiple energy products and commodities utilized in the launch of a space vehicle.

Referring now to the drawings, an integrated polygeneration system and process is illustrated for the generation of multiple energy products and commodities on-location for utilization in the launch and support of a shuttle vehicle at a space flight center.

The polygeneration system and process is designated by dotted lines 10 (FIG. 1). There is included in the process and system a coal gasification and gas cleanup system 12. Saturated steam 14 and a gasification gas 16, which is a medium BTU gas, are produced by the coal gasification process. Saturated steam 14 and a first split stream 16a of the gasification gas are delivered to a combined cycle power generation system and process 18. In the combined cycle power generation system, conventional turbines and heat exchangers for the generation of electrical and thermal energy are provided. A second stream 16b of the gasification gas 16 and steam 14 are delivered to a hydrogen production and liquefaction system and process 22. In the hydrogen production and liquefaction station liquid hydrogen is produced and delivered to a storage tank 24. The stored liquid hydrogen is piped to a launch pad 26 for fueling of a space shuttle vehicle 28 at the launch site.

Power from the combined cycle power generation station 18 is delivered to a substation 30 at the space flight center for utilization.

An air separation system and process 32 provides oxygen to the gasification system 12 and also supplies gaseous nitrogen through a pipeline 34 to the launch complex site 26 where it is utilized as an inert gas to purge environments of the space vehicle 28 or other facilities at the complex site.

The thermal energy from the combined cycle power generation system 18 is delivered to a launch complex utility station 36 where it is stored in heated water and piped to other facilities for utilization. For example, the heated water may be piped to a vehicle assembly building 38 at the space center for heating and air conditioning the interior space of the building.

Figure 2:
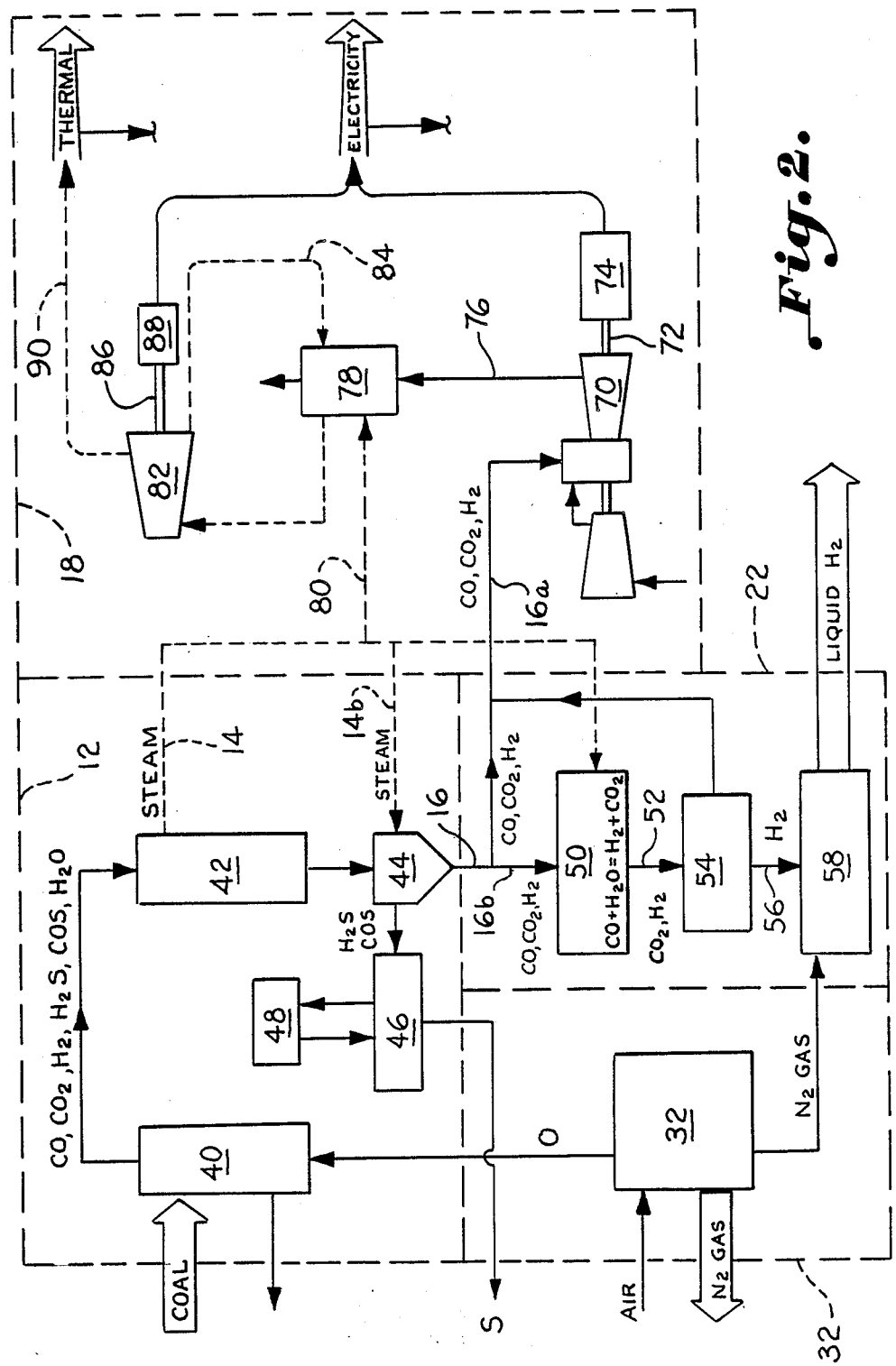
FIG. 2 is a block diagram illustrating an integrated system and process for generating multiple energy products and commodities on location as utilized in the launch of a space vehicle.

Referring now in more detail to the integrated polygeneration system and process of the present invention, as can best be seen in the system and process flow of FIG. 2, the gasification and gas cleanup station includes a coal gasification plant and process 40 which may be any suitable coal gasification system such as that disclosed in the Electrical Power Research Institute Report referenced above at pages 5-23referred to as the "Texaco" System with heat recovery as described on pages 5-23 through 5-27. The gasification plant includes a gasifier which gasifies the coal by means of the partial oxidation process that produces a medium BTU gas which is primarily CO and H$_2$. This process has a very good efficiency and is essentially free of higher hydrocarbons such as methane (CH4) which are unwanted for producing the final product, hydrogen. Typical composition of the product gas is shown in FIG. 2, which includes carbon monoxide, hydrogen, carbon dioxide, hydrogen sulfide, and steam. The gasification gas is a hot, dirty, and particulate laden gas. The product gas stream will exit the gasifier at about 2400-2700 degrees Fahrenheit. The product gas stream enters a heat recovery unit 42 which may be any suitable heat recovery unit such as that disclosed in the "Texaco" system above. Heat recovery from this gas stream occurs in two sections. First is the radiant boiler section which lowers the gas temperature sufficiently to allow the molten slag droplets from the coal to solidify before they reach the convective boiler section. Generally, high pressure saturated steam is produced in the radiant section and low pressure steam is generated in the convective section.

From the heat recovery unit 42, the gases flow to an acid gas removal (AGR) process and system 44 which selectively removes the hydrogen sulfide and carbonyl sulfide. Steam 14b is also delivered to the AGR process. Any suitable process may be used at the station 44 for removing the acid gases such as the Selexol process, which is a conventional process described in the EPRI report above at page 5-27. The Selexol process is a physical solvent process which physically absorbs the acid gases from the stream. There are several commercially available processes for the removal of H$_2$S and COS from the gas stream. Generally, these processes either chemically or physically absorb the acid gases from the process stream and then release them through a regeneration process.

H$_2$S gases removed in AGR must be further processed to an acceptable form. This is done by any suitable process in a sulfur recovery system and process 46. Preferably, the sulfur is recovered in a conventional Claus sulfur conversion process. This is a conventional process in which the hydrogen sulfide is oxidized to elemental sulfur and water. The sulfur is recovered and may be marketed as a by-product of the system of the present invention. The COS is converted to H$_2$S and then recycled in the sulfur conversion unit.

A tail gas unit is illustrated at 48 for converting any residual sulfur left in the Claus sulfur conversion unit 46 and redelivering it to the Claus conversion unit for removal and recovery of the sulfur. The tail gas unit 48 utilizes a conventional Shell Claus Offgas Treatment (SCOT). In this process, the residual sulfur is converted to hydrogen sulfide and fed back to the sulfur recovery unit 46 whereby the overall sulfur recovery efficiency is greater than ninety-nine percent.

In the acid gas removal unit 44, only the hydrogen sulfide and carbonyl sulfide gases are removed. It is the combination of the acid removal, sulfur removal, and tail gas processes which make coal gasification such an attractive choice for using coal in an environmentally acceptable way. These processes will allow total sulfur removal from the product gas such that emission from this plant is well below Environmental Protection Agency (EPA) emission requirements. The product gas which leaves the AGR process is essentially sulfur free and will burn very similar to natural gas. Out of AGR the gas stream 16 is split with the first stream 16a going to the combined cycle power generator 18 and the second stream 16b going to the hydrogen production and liquefaction system 22.

In accordance with the present invention, carbon dioxide is left in the resultant second gasification gas stream for the purposes of producing liquid hydrogen as will be described more fully hereinafter. The second gas stream 16b is first delivered to a shift conversion plant and process 50 wherein the hydrogen content of the gas stream is increased. This may be done in accordance with any shift conversion process wherein water or steam is added to the gas to increase its hydrogen content. One suitable shift conversion process is that commonly identified as the Haldor-Topsoe Process. CO is reacted with steam H$_2$O in the presence of a catalyst producing H$_2$ and CO$_2$ according to the formula: CO+H$_2$O=H$_2$ CO$_2$. Therefore, out of the shift conversion process both the H$_2$ and CO$_2$ content of the gas is increased.

From the shift conversion station 50, a third gas stream 52 containing the carbon dioxide and hydrogen is delivered to a pressure swing adsorber 54 which includes a conventional pressure swinger adsorber (PSA) unit such as that manufactured by Union Carbide. In the pressure swinger adsorber, the hydrogen is purified to 99.999 percent pure hydrogen as is necessary to meet the requirements. In the PSA, the carbon dioxide is removed leaving a hydrogen gas stream 56 which contains the purified hydrogen gas only.

The purified hydrogen gas stream is delivered to a hydrogen liquifier system and process 58. In the liquifier plant, a basic hydrogen liquifying process is carried out to convert the hydrogen gas to a liquid. A suitable conventional system and process is that commonly referred to as the Linde Hampson System.

The first, split gas stream 16a is delivered to the combined cycle power generation station 18. As illustrated, the station 18 includes a combustion turbine 70 which is designed for a medium BTU gaseous fuel. The BTU of the medium BTU gas will be in the range of 250-300 BTU's per standard cubic foot. The output shaft 72 of the combustion turbine 70 is connected to a conventional electrical generator 74 for producing electrical power. The exhaust 76 from the combustion turbine 70 is delivered to a conventional heat recovery steam generator 78 which is designed to superheat the saturated steam coming from line 80 and to generate superheated steam. Boiler feed water 84 which condenses from a steam turbine 82 is also passed through the heat exchanger 78 wherein the boiler feed water is heated again. The steam turbine 82 includes an output shaft 86 which drives a second electrical generator 88 to produce electrical power.

Thermal energy is extracted from the steam turbine at 90 which may be delivered to a utilization facility for subsequent space heating and air conditioning. The air separation system and process 32 is a typical cryogenic air distillation process which will be producing nitrogen ($GN_2$) purity will be according to requirements and oxygen purity to the gasifier will be optimized between 95–99% based on downstream process requirements.

In accordance with the present invention, $CO_2$ is allowed to go through the AGR system. Although this configuration will present an increased burden on the $H_2$ purification system, this disadvantage is overcome by other considerations.

By selectively absorbing the sulfur compounds from the feed stream, $CO_2$ will pass through the AGR system to the cogeneration plant. Since the $CO_2$ will be a compressed gas, its energy can then be recovered in the combustion turbines instead of venting it in the AGR system.

Allowing the $CO_2$ through the AGR system will result in cheaper AGR capital and operation costs. Costs are reduced by eliminating the extra absorption column, knockout drums, and auxiliary equipment needed for $CO_2$ removal. If $CO_2$ is not processed in the AGR system, less solvent is required.

If $CO_2$ is not removed in the AGR system, the $H_2S$ concentration in the feed stream to the sulfur recovery plant 46 will be substantially increased. This increased $H_2S$ concentration will permit the use of a Claus sulfur recovery system, which is one of the most reliable sulfur recovery processes available and which generally offers the most economically favorable system.

The shift conversion system 50 is located downstream of the AGR system 44. Shift conversion prior to the AGR process will hydrolyze and hydrogenate sulfur compounds to $H_2S$ which offers certain advantages in terms of sulfur handling and recovery.

It has been found, however, there are several disadvantages associated with shifting the gas prior to AGR. First, shifting before AGR would require a larger volume of catalysts since all of the gas would have to be shifted instead of just the gas required for $H_2$ production and liquefaction. Furthermore, the traditional iron-chrome catalyst could not be used since it is poisoned by sulfur. Molybdenum-cobalt catalysts on an aluminum bed would be required. Second, the gas stream prior to AGR is hotter than that following AGR. Since shift conversion is an exothermic reaction, the high-temperature shift is not as efficient as a low-temperature shift.

As heretofore described, the combined-cycle cogeneration plant consists of one or more combustion turbines and associated exhaust heat recovery units which in turn, supply working fluid to a steam turbine. These two basic types of prime movers drive generators for electric power production. The turbines, steam generators, and electric generators are supported by the plant mechanical and electrical auxiliaries (pumps, motors, heat exchangers, and electric power distribution). The steam side of the combined-cycle incorporates provisions for extracting thermal energy at one or more points in the steam cycle.

The purpose of electric generation at the polygeneration facility is to meet the rather substantial electric power requirements of the attendant processes, primarily in air separation and $H_2$ liquefaction. This need, coupled with the availability of a substantial amount of recoverable waste heat from the gasifier and dual character (fuel and feedstock) of the gasifier product, provides favorable economics for in-plant power production.

The combined cycle is a most efficient thermodynamic cycle. The combined cycle generation block includes a conventional combustion turbine with heat recovery to generate additional steam for expansion through steam turbine, both turbines of which are generating electric power. The term "combined cycle power generation" refers to the fact that the combustion turbine is one thermo dynamic cycle called the Brayton cycle. The steam turbine is the second thermo dynamic cycle called Rankine cycle. The combination comes in the fact that the thermal energy in the exhaust of the combustion turbine is used to generate high pressure, superheated steam from makeup water in the closed loop steam cycle and expansion through the steam turbine. The high temperature combustion turbine exhaust is used to superheat the saturated steam from the gasifier heat recovery unit. This steam is expanded through the steam turbine for the second half of the combined cycle power generation system.

In general, combustion turbines are designed for a specific output rating with a given fuel and at specific ambient conditions.

The steam turbine 82 on the other hand, can be fitted to a rather broad range of steam supply conditions. In fact, the range of design choices that in total determine and describe the steam cycle will permit tailoring the equipment to meet a broad range of operating requirements. Steam turbines can operate in the 40% to 100% load range with minimal efficiency degradation.

The heat recovery unit 78 is designed to accept up to 75% of its makeup as saturated steam from the gasifier waste heat boiler. It supplies superheated steam at moderate inlet conditions to the steam turbine. Inlet conditions are preferably in the range of 1,300 to 1,400 pounds per square inch absolute (psia) and 850 degrees to 950 degrees F.

While the heat recovery steam generators may be a separate unit or a part of a combinedcycle package. They are available from major turbomachinery manufacturers and from heat exchanger companies.

The combustion turbine 70 is commercially available and may be modified to accommodate medium-Btu gaseous fuel by one of average skill in the art having been taught the present invention. The modifications include a different nozzle design and a larger combustor basket and are available from major manufacturers. The higher volume of fuel gas will require somewhat larger piping and valving facilities.

The steam turbine 78 would be of the medium-size category and would most likely be a condensing type with one or more extractions.

Other polygeneration process requirements will also use extraction steam, including the high probability of steam injection for $NO_x$ control in the combustion turbines. The availability of extraction for this purpose from turbines 82 should mitigate both the supply and purity demands. The increased mass flow through the turbine due to $H_2O$/steam injection will yield a significant increase in power output.

The unique feature of the heat recovery unit 78 is its capability to integrate the varying inputs from the gasifier waste heat boiler and the feedwater system to provide a quick response to load variations while maintaining steam quality within turbine inlet specifications.

The 60-Hz electric power generators 74, 88 would likely be high-speed design (3,600 r/min, cylindrical rotor), 3 phase, wye connected to generate 13,800 V.

It will be understood, of course, that while the forms of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein disclosed.

What is claimed is:

1. A polygeneration system for generating: multiple energy products, including electrical power from a compressed gas stream, the compression of which is obtained in part with selective removal of carbon dioxide from another gas stream with a pressure swing adsorber; and commodities, including particularly liquid hydrogen of high purity adequate for use with main thrust engines of a space shuttle, and gaseous nitrogen for use to purge critical environments in such space shuttle; in an integrated system at a single geographical location constituting a space shuttle launch vehicle complex, said system comprising:

coal gasification and gas cleanup apparatus at said system location, which apparatus includes:

a coal gasification unit adapted for gasifying coal supplied thereto and producing a medium BTU gas stream therefrom at a relatively high temperature;

a heat recovery unit for receiving said medium BTU gas stream and producing saturated steam from said medium BTU gas stream for use at a plurality of locations downstream from said heat recovery unit, an acid gas removal unit receiving said medium BTU gas stream passed through said heat recovery unit and a portion of said saturated steam produced by said heat recovery unit, and removing only hydrogen sulfide and carbonyl sulfide therefrom, and a sulfur recovery unit for removing sulfur from said hydrogen sulfide and carbonyl sulfide; wherein said acid gas removal unit produces a resultant gasification gas stream generally free of sulfur and unshifted; and further including means for splitting said resultant unshifted gasification gas stream into first and second gas streams generally intended for power generation and liquid hydrogen production, respectively;

a combined cycle power generation system at said location for receiving said first gas stream, which power generation system includes:

a gas turbine to which said first gas stream is delivered for driving same, an electrical generator operatively associated with said gas turbine for producing electricity for utilization at said launch complex, a heat exchanger for receiving exhaust gas from said gas turbine and receiving a portion of said saturated steam produced by said heat recover unit and thereby produce a superheated steam, a steam turbine receiving said superheated steam for driving same, an electrical generator operatively associated with an output shaft of said steam turbine for generating electricity for utilization at said launch complex, and means for extracting heat from said steam turbine in the form of thermal energy and storing said thermal energy for subsequent utilization in space heating and air conditioning at said launch complex; and a hydrogen liquefaction and production system at said location to which said second stream is delivered, which liquefaction and production system includes:

a shift conversion unit which receives said second gas stream and a portion of said saturated steam produced by said heat recovery unit, and produces therefrom a third gas stream with enhanced hydrogen and carbon dioxide content, a pressure swing adsorber unit, which receives said third gas stream, and selectively removes carbon dioxide under pressure from said third gas stream and purifies said hydrogen in said third gas stream to a relatively high purity, greater than at least 99.9% purity, which is required for use with main thrust engines of the space shuttle;

structure which mixes said removed carbon dioxide under pressure with said first stream so as to enhance driving of said gas turbine thereby, a hydrogen liquefaction unit receiving said hydrogen gas stream, purified to the shuttle requirement specifications of greater than at least 99.9% purity, and producing therefrom liquid hydrogen of such relatively high purity greater than at least 99.9% purity for use with said space shuttle;

storage means for receiving said liquid hydrogen and storing said liquid hydrogen at said launch complex for utilization with main thrust engines complex;

air separation means at said launch complex for producing oxygen and gaseous nitrogen; and delivery means for delivering said gaseous nitrogen to a launch site at said launch complex for use as an inert gas for purging critical environments in and around said space shuttle, and for delivering oxygen to said gasification unit.

2. A system as in claim 1, wherein:

said coal gasification unit is adapted to produce said medium BTU gas stream generally in a temperature range of from about 2400 to about 2700 degrees Fahrenheit; and said pressure swing adsorber unit is adapted to purify said hydrogen to at least 99.999% pure.

3. An integrated on-site multiple energy products and commodities process for a space shuttle launch vehicle complex, including the production of electrical power from a compressed gas stream, the compression of which is obtained in part with selective removal of carbon dioxide from another gas stream with a pressure swing adsorber, and further including particularly the production of liquid hydrogen of adequate high purity for use with main thrust engines of a space shuttle, and the production of gaseous nitrogen for purging critical environments of such space shuttle, said process comprising the steps of:

separating air into oxygen and nitrogen;

using a portion of the liberated nitrogen to purge selected areas of the launch complex, including launch vehicles thereof such as a space shuttle;

supplying coal and the liberated oxygen to a coal gasification device which outputs a medium BTU gas stream comprising carbon monoxide, carbon dioxide, hydrogen, hydrogen sulfide, carbonyl sulfide and steam;

supplying said medium BTU gas stream to a heat recovery unit which draws an amount of steam therefrom to provide a separable source of steam for use downstream from such heat recovery unit, while also passing said medium BTU gas stream otherwise unchanged;

performing acid gas removal and desulfurization on said medium BTU gas stream with an input drawing a portion of steam from said separable source of steam so as to separately produce sulfur and an unshifted separable resulting gas stream including carbon monoxide, carbon dioxide and hydrogen, all under pressure;

subjecting a portion of said unshifted resulting gas stream to a shift conversion process which obtains water therefor drawn from a portion of steam from said separable source of steam, and which outputs another gas stream having increased hydrogen and carbon dioxide content and further having all previous carbon monoxide of said resulting gas stream converted to carbon dioxide;

supplying said another gas stream of carbon dioxide and hydrogen from said shift conversion process to a pressure swing adsorber which liberates the carbon dioxide content thereof under pressure and produces hydrogen of greater than at least 99.9% purity to meet use requirements of the space shuttle main thrust engines;

mixing such liberated carbon dioxide under pressure with said unshifted resulting gas stream so as to form an enhanced gas stream having increased compressed carbon dioxide content;

supplying hydrogen produced by said pressure swing adsorber and a portion of said nitrogen separated from air to a liquifier which outputs liquid hydrogen of greater than at least 99.9% purity, using said liquid hydrogen of greater than at least 99.9% purity to fuel thus engines of space vehicles at said complex; and using said enhanced gas stream having increased compressed carbon dioxide content to operate a combustion turbine which in turn drives a first electric generator to generate electric power used at said complex.

4. A process as in claim 3, further comprising the steps of:

obtaining exhaust from the combustion turbine and obtaining a portion of steam from said separable source of steam, and using both of same to drive a heat recovery steam generator which outputs steam;

driving a steam turbine with said steam output of said steam generator;

driving a second electric generator with output from said steam turbine so as to produce electric power used at said complex; and obtaining thermal energy from said steam turbine and using same at said complex.

5. A process as in claim 3, wherein said hydrogen purity is at least 99.99%.

* * * * *